(12) United States Patent
Sigurdsson et al.

(10) Patent No.: US 8,914,813 B1
(45) Date of Patent: Dec. 16, 2014

(54) INTERFACES TO ENABLE CROSS-BROWSER EXTENSIONS AND APPLICATIONS THEREOF

(75) Inventors: Johann Tomas Sigurdsson, Westmount (CA); Sigurdur Asgeirsson, Beaconsfield (CA)

(73) Assignee: Google Inc., Mountain View, CA (US)

( * ) Notice: Subject to any disclaimer, the term of this patent is extended or adjusted under 35 U.S.C. 154(b) by 672 days.

(21) Appl. No.: 12/757,537

(22) Filed: Apr. 9, 2010

(51) Int. Cl.
*G06F 3/00* (2006.01)

(52) U.S. Cl.
USPC ........................................................ 719/328

(58) Field of Classification Search
None
See application file for complete search history.

(56) References Cited

U.S. PATENT DOCUMENTS

| 7,069,562 | B2 | 6/2006 | Kushnirskiy et al. | |
|---|---|---|---|---|
| 2003/0101235 | A1* | 5/2003 | Zhang | 709/218 |
| 2003/0126311 | A1* | 7/2003 | Kushnirskiy et al. | 709/328 |
| 2004/0093562 | A1* | 5/2004 | Diorio et al. | 715/513 |
| 2004/0133563 | A1* | 7/2004 | Harvey et al. | 707/3 |
| 2010/0122157 | A1* | 5/2010 | Cepero Gonzalez | 715/239 |

* cited by examiner

*Primary Examiner* — H S Sough
*Assistant Examiner* — Carina Yun
(74) *Attorney, Agent, or Firm* — Sterne, Kessler, Goldstein & Fox PLLC

(57) ABSTRACT

Embodiments of this invention relate to an application program interface to enable browser extensions which may be executed in different browsers. In an embodiment, a browser extension may be written in using commands written in a cross-browser application program interface. When the browser extension is executed, the cross-browser commands may be translated into a native command of the browser. In an embodiment, the commands that require access to a document object model (DOM) of a page loaded in the browser may be executed on the thread that renders the loaded page. In a further embodiment the cross-browser application program interface may be, at least in part, an asynchronous interface. In this way, the cross-browser extension application program interface provides a stable, uniform interface to implement browser extensions that can operate in a plurality of different types of web browsers.

17 Claims, 4 Drawing Sheets

INTERFACES TO ENABLE CROSS-BROWSER EXTENSIONS AND APPLICATIONS THEREOF

BACKGROUND

1. Field

This field is generally related to browser extensions.

2. Related Art

Additional features can be added to browsers, such as a Chrome browser available from Google, Inc. or a Firefox browser available from Mozilla, using browser extensions. In general, the browser extension must be implemented for a particular browser type (e.g. Firefox) and often for a particular operating system (e.g. a Windows operating system available from Microsoft Inc.). To support multiple browsers or operating systems, multiple versions of the browser extension generally must be developed.

Some web sites provide features that, while not constituting a browser extension, effectively augment browser functionality. For example, some web pages may present a user-interface element that represents a toolbar at the top of the page. Those web pages may include an additional HTML IFRAME or FRAME below the toolbar user-interface element that navigates to different web content. In contrast to browser extensions, these user-interface elements may be browser-independent. However, they are not persistently installed in the browser. For this reason, they are generally only present when the user navigates to the particular web sites that present these elements. Further, because the user-interface element is merely presented on the browser's content area and not installed in the browser, the user-interface element may not be able to access as many system resources as a browser extension.

In another example, some websites provide bookmarklets that may provide some additional functionality to a browser. Bookmarklets are included in a browser as a bookmark and, when selected, cause JavaScript code to execute. Bookmarklets have been used to share the web page currently being viewed and to alter the web page currently being viewed. Because bookmarklets are included in a browser as a bookmark, bookmarklets are more persistent than user-interface elements included in web pages. However, similar to the user-interface elements included in web pages, bookmarklets may not be able to access as many system resources as browser extensions. Further, bookmarklets are limited in that, in general, a browser always presents a bookmarklet to a user as a bookmark.

Improved systems and methods are needed that extend browser functionality.

BRIEF SUMMARY

Embodiments of this invention relate to an application program interface to enable browser extensions that can be executed in different browsers. In an embodiment, a system enables cross-browser extensions. The system includes a translation module configured to receive a cross-browser command included in a browser extension. The command is formatted according to a cross-browser extension application program interface, and the cross-browser command instructs a native browser to access a document object model of a page. The translation module is also configured to interpret the cross-browser command to issue at least one native command formatted according to a native browser extension application program interface to the native browser to execute the cross-browser command. The system further includes a DOM interface module configured to run on a renderer thread of the native browser, separate from the translation module, that renders the loaded page. The DOM interface module, when loaded in the renderer thread, is configured to receive a message from the translation module to access a document object model of a page loaded in a native browser, to access the document object model in response to the message, and to send a message with data from the document object model to the translation module. In this way, the cross-browser extension application program interface provides a stable, uniform interface to implement browser extensions that can operate in a plurality of different types of web browsers.

In a second embodiment, a computer-implemented method enables cross-browser extensions. In the method, a cross-browser command included in a browser extension is received. The command is formatted according to a cross-browser extension application program interface, and the cross-browser command instructs a native browser to access a document object model of a page. Once received, the cross-browser command is interpreted. A native command formatted according to a native browser extension application program interface is issued to the native browser to execute the cross-browser command. A message to access a document object model of the page is received at a renderer thread that renders a page in the native browser. The document object model of the page is accessed on the renderer thread. Finally, from the renderer thread, a message with data from the document object model is sent. In this way, the cross-browser extension application program interface provides a stable, uniform interface to implement browser extensions that can operate in a plurality of different types of web browsers.

In a third embodiment, a system enables cross-browser extensions. The system includes a browser extension with a series of commands. At least some of the commands are formatted according to a cross-browser extension application program interface. The system further includes a translation module configured to receive a cross-browser command included in a browser extension. The command is formatted according to a cross-browser extension application program interface, and the cross-browser command instructs a native browser to access a document object model of a page. The translation module is also configured to interpret the cross-browser command to issue at least one native command formatted according to a native browser extension application program interface to the native browser to execute the cross-browser command. The system further includes a DOM interface module configured to run on a renderer thread of the native browser, separate from the translation module, that renders the loaded page. The DOM interface module, when loaded in the renderer thread, is configured to receive a message from the translation module to access a document object model of a page loaded in a native browser, to access the document object model in response to the message, and to send a message with data from the document object model to the translation module. In this way, the cross-browser extension application program interface provides a stable, uniform interface to implement browser extensions that can operate in a plurality of different types of web browsers.

In a fourth embodiment, a system enables cross-browser extensions. The system includes a translation module configured to receive a cross-browser command included in a browser extension. The cross-browser command is formatted according to a cross-browser extension application program interface. The translation module is also configured to interpret the cross-browser command to issue at least one native command formatted according to a native browser extension application program interface. The system also includes a native browser configured to receive the commands formatted according to a native browser extension application program interface to execute the browser extension. In this way, the cross-browser extension application program interface provides a stable, uniform interface to implement browser extensions that can operate in a plurality of different types of web browsers.

Further embodiments, features, and advantages of the invention, as well as the structure and operation of the various embodiments are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments of this invention relate to an application program interface to enable browser extensions that can be executed in different browsers. In an embodiment, a browser extension may be written using commands written according to a cross-browser application program interface. When the browser extension is executed, the cross-browser commands may be translated into native commands of the browser. In an embodiment, the commands that require access to a document object model (DOM) of a page loaded in the browser may be executed on the thread that renders the loaded page. In a further embodiment the cross-browser application program interface may be, at least in part, an asynchronous interface. In this way, the cross-browser extension application program interface provides a stable, uniform interface to implement browser extensions that can operate in a plurality of different types of web browsers. These and other embodiments are described below with reference to the drawings.

Figure 1:
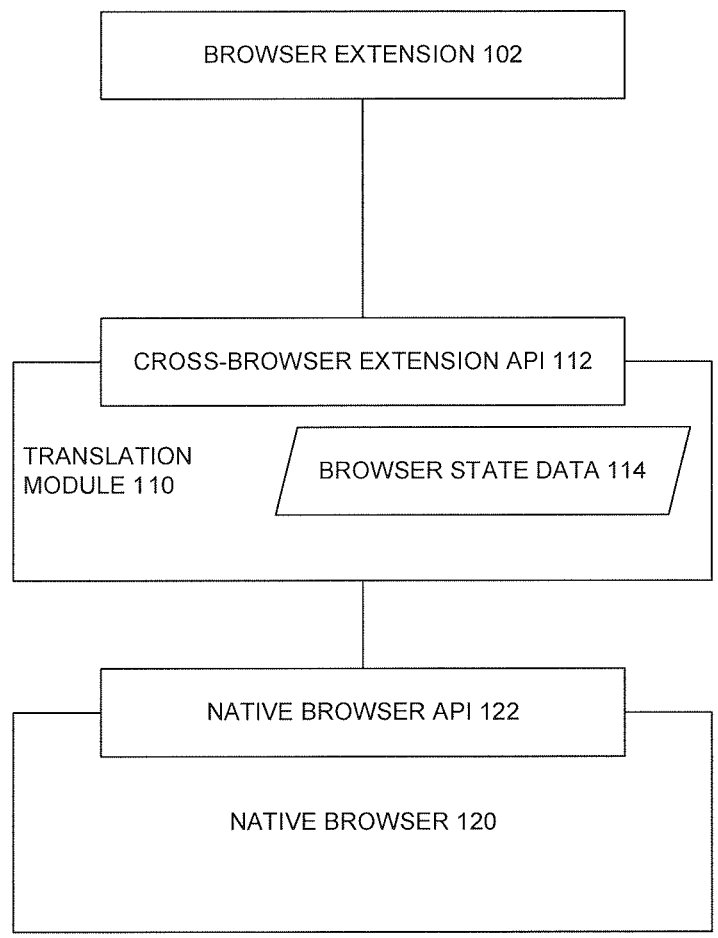
FIG. 1 is a diagram illustrating a system with an API to enable cross-browser extensions, according to an embodiment.

FIG. 1 is a diagram illustrating a system 100 with application program interfaces (APIs) to enable cross-browser extensions, according to an embodiment. System 100 includes a browser extension 102, a translation module 110, and a native browser 120. Browser extension 102 communicates with a translation module 110 according to a cross-browser API 112, and translation module 110 communicates with a native browser 120 according to a native browser API 122.

Browser extension 102 includes a series of commands. The commands may be formatted according to cross-browser extension API 112. In an embodiment, the browser extension may not be represented in native machine instructions. Instead, the browser extension may be represented, at least in part, in an interpretive language, such as at least one of HTML, XML, JavaScript, or Cascading Style Sheets (CSS).

Cross-browser extension API 112 may be, at least in part, an asynchronous interface. Each command may be a function called asynchronously. For example, when a function is called the extension may continue operation to a subsequent function before completion of the preceding function. Once the preceding function is completed, a callback function implemented in browser extension 102 may be executed. In this way, execution of browser extension 102 may not need to wait for a completion of each cross-browser command. Further, an asynchronous interface may help prevent deadlocks and, therefore, may be more stable.

Translation module 110 is configured to receive the cross-browser commands included in browser extension 102 formatted according to a cross-browser extension API 102. Translation module 110 may interpret and execute the cross-browser command. Translation module 110 may, for example, determine the native-browser command in native browser API 122 that corresponds to the cross-browser command. Then, translation module 110 may call the native-browser command to instruct native browser 120 to execute the command. By executing translating the cross-commands into commands of the native browser, translation module 110 provides a uniform interface for browser extensions. In this way, browser extension 102 can be executed on several different browser types (such as an Internet Explorer browser and a Chrome browser).

In an example, no single native browser command in native browser API 122 may execute the functionality of the cross-browser command. In those cases, the translation module 110 may determine and execute multiple native-browser commands to execute the functionality of the cross-browser command.

In an embodiment, browser 120 may not expose enough of its internal state data for translation module 110 to execute each and every cross-browser extension API command. For this reason, translation module 110 may maintain browser state data 114. For example, browser 120 may not have a command available in native browser API 122 that identifies the tabs presently open on the browser. However, cross browser extension API 112 may include a command that requests the presently open tabs. In that example, browser state data 114 may keep track of the tabs presently open on the browser. In this way, translation module 110 may execute the cross-browser command by referencing browser state data 114.

Native browser 120 enables a user to browse web content. Native browser 120 may be any type of browser including, but not limited to, a CHROME browser available from Google Inc., an INTERNET EXPLORER browser available from Microsoft Inc., or a SAFARI browser available from Apple Inc. As described in more detail below, native browser 120 may include multiple threads of execution.

In an embodiment, translation module 110 may be installed as a browser plug-in implemented in native code, such as native machine code. In that embodiment, translation module 110 may implement a browser plug-in interface, such as an ActiveX interface or a NPAPI interface. System 100 and each of its components is described in greater detail below with respect to FIG. 2.

Figure 2:
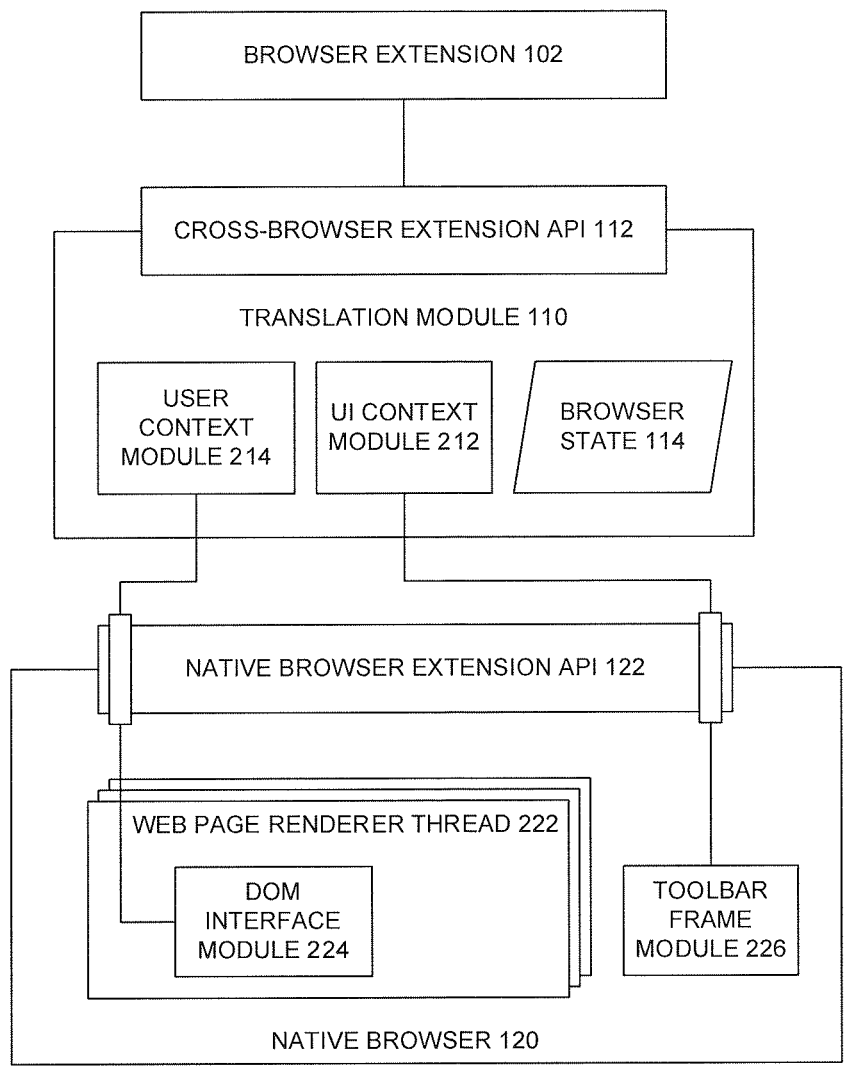
FIG. 2 is a diagram illustrating the system in FIG. 1 in greater detail.

FIG. 2 is a diagram illustrating system 100 in greater detail. In addition to the components shown in FIG. 1, translation module 110 in FIG. 2 includes a user context module 214 and a UI context module 212. Also in FIG. 2, native browser 120 includes a toolbar frame module 226 and a web page renderer thread 222, which includes a DOM interface module 224.

As mentioned above, cross-browser extension API 112 defines the manner in which browser extension 102 makes browser commands, regardless of the type of browser (e.g. an INTERNET EXPLORER browser or a CHROME browser). Cross-browser extension API 112 may provide sufficient functionality to enable extensions in many applications to be written in a browser-independent way. In an example described in more detail below with respect to FIG. 4, cross-browser extension API 112 may be general enough to enable a toolbar extension to be implemented in a browser-independent way. At the same time, the three major browser types—the INTERNET EXPLORER browser, the FIREFOX browser, and the CHROME browser—provide different functionality to their extensions. Cross-browser extension API 112 may be specific enough so as to enable cross-browser extensions to utilize the functionality offered by each of the three major browsers.

In an embodiment, cross-browser extension API 112 offers commands for one or more of the following:

(a) controlling native browser 120, such as creating windows or tabs in native browser 120, enumerating windows or tabs, retrieving the most recently used tab or window, retrieving the foreground tab or window, or causing a tab or window to navigate to a new Uniform Resource Identifier (URI);

(b) creating a DOM context data structure to access the DOM of a page loaded in a particular window or tab;

(c) creating various UI surfaces in native browser 120, such as a main toolstrip, a side bar or bottom bar, a pop-up window, a dialog box, a drop-down menu or a button;

(d) making network requests (e.g. HTTP or HTTPS requests) using native browser 120's proxy settings;

(e) accessing and modifying browser 120's bookmarks;

(f) receiving browsing notifications based on changes in a context of native browser 120; and (g) exposing a data object in browser extension 102 to a page loaded in native browser 120.

In an example, the UI surfaces created in (c) may be defined, at least in part, using HTML, JavaScript, or Flash. In general, the commands (a)-(e) are likely to be initiated in browser extension 102, whereas commands (f)-(g) may be initiated by browser 120 or even a page loaded in browser 120. In embodiments, the UI surfaces of a browser extension may be rendered using browser 120's HTML rendering engine, or they may be rendered using a different rendering engine.

In an embodiment with command (f), a particular function in browser extension 102 may be executed on particular browser events. The functions may be registered to execute upon notification of particular events. For example, browser 120 may send a notification to execute a function that tracks usage when a user navigates to a new page. In an example involving command (d), extension 102 may include a timer. A page loaded in native browser 120 may access the timer in extension 102 and send timing data to a remote server. In this way, the remote server can conduct analysis on how long it takes for aspects of the page to load in native browser 120.

As mentioned above, translation module 110 may interpret and execute the cross-browser commands in browser extension 102. In an embodiment, translation module 110 may include different sub-modules that execute different types of commands. User context module 214 may perform background tasks. UI context module 212 may perform user interface tasks. For example, UI context module 212 may create user interface surfaces, such as a tool strip, a sidebar, or a drop-down menu. Each of UI context module 212 and user context module 214 may execute HTML or Javascript commands in browser extension 102. Both UI context module 212 and user context module 214 may run on the same thread and may communicate with each other via direct function calls. UI context module 212 and user context module 214 communicate with native browser 120 using native browser API 122. In an embodiment, browser extension code running within these modules may only have access only to the cross-browser APIs, not the native browser API.

In an embodiment, to create user interface surfaces, UI context module 212 may communicate with toolbar frame module 226. Toolbar frame module 226 is configured to display a toolbar to the user of native browser 120. In an example, data from UI context module 212 may be blotted to data from toolbar frame module 226.

As mentioned above, native browser 120 may have multiple threads. The term "thread" as used herein refers to an independent thread of execution, including operating system processes. Web page renderer thread 222 may render web content, such as HTML and display the web content to a user. To assist in rendering web content, web page renderer thread 222 may include a webkit module (not shown).

Web page renderer thread 222 includes a DOM interface module 224. DOM interface module 224 accesses the document object model of a page presently loaded in web page renderer module 222. DOM interface module 224 may be configured to read data from the document object model or to modify the document object model. For example, DOM interface module 224 may be used to pre-populate text fields on a web page.

To execute a command in browser extension 102 requiring access to the document object model of the presently loaded page, user context module 124 may communicate with DOM interface module 224 via message passing. In an embodiment, user context module 214 may send an inter-process communication message using, for example, pipes or shared memory. As mentioned above, communication between user context module 214 and DOM interface module 224 may be asynchronous. In other words, when user context module 214 sends a message to DOM interface module, translation module 110 may not wait for a response from DOM interface module 224 before executing the next command in extension 102. If the message sent to DOM interface module 224 involves a response, DOM interface module 224 may send the response back to user context module 214 using message passing. When user context module 214 receives the message, the user context module 214 may execute a callback function in browser extension 102.

In an example, user context module 214 may send a message to alter a text field to DOM interface module 224. In another example, user context module 214 may send a message to get data from DOM interface module 224. In that example, DOM interface module 224 may access the DOM to get the data send the data back to user context module 214 by sending a message. When user context module 214 receives the message, user context module 214 may execute a callback function on browser extension 102. User context module 214 may pass the data from the DOM into a callback function as an input parameter.

In an embodiment, native browser 120 may include multiple web page renderer threads 222—perhaps one for each window or tab. In that embodiment, each web page renderer thread 222 may have a corresponding DOM interface module 224.

Having DOM interface module 224 on web page renderer thread 222 and having the interface to DOM interface module 224 be asynchronous may cause system 100 to be more stable. For example, the occurrence of deadlocks may be reduced. Also, sending portions of the extension code to DOM interface instead of individual commands may improve speed by reducing the necessary IPC messages.

Each of translation module 110, user context module 214, UI context module 110, DOM interface module 224, native browser 120, and toolbar frame module 226 may be implemented in hardware, software, firmware or any combination thereof.

System 100 may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Figure 3:
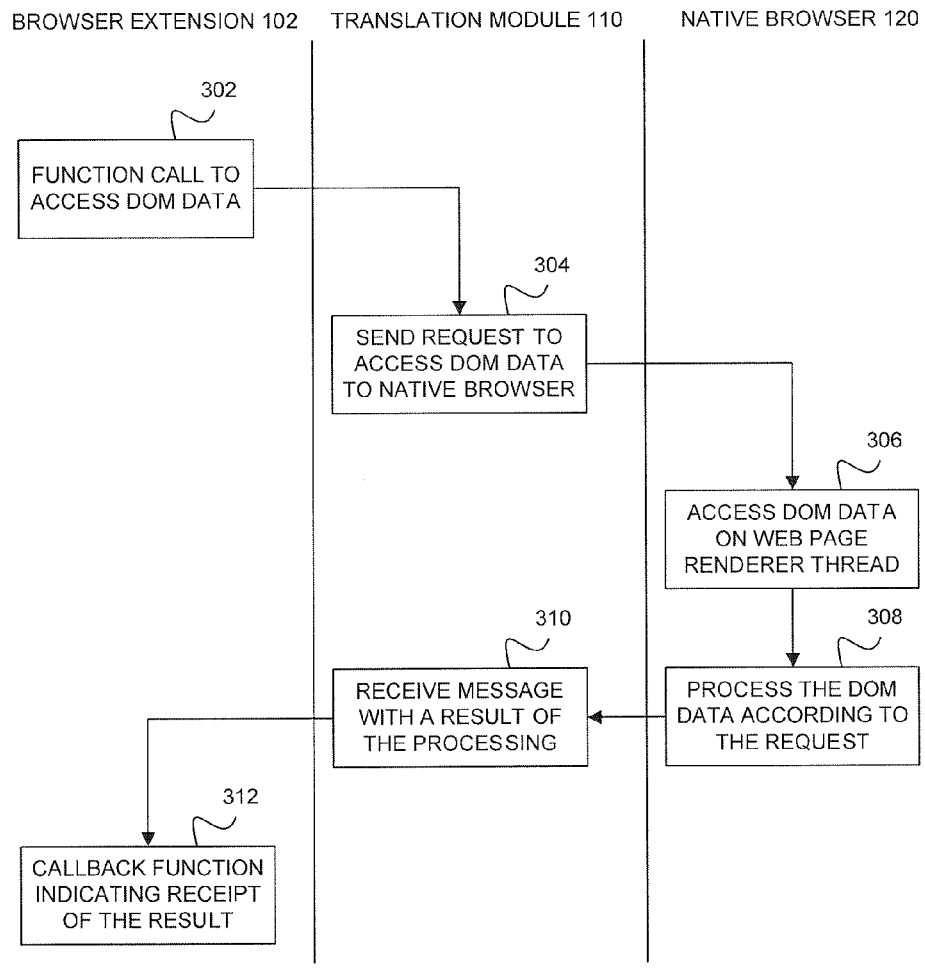
FIG. 3 is a flowchart illustrating method for accessing a DOM of a page loaded in a browser, according to an embodiment.

FIG. 3 is a flowchart illustrating method 300 for accessing a DOM of a page loaded in a browser according to an embodiment. For clarity, method 300 is described with respect to the components of system 100. However, method 300 is not meant to be limited thereto.

Method 300 begins with a function call in browser extension 102 to access DOM data at step 302. The function call may be formatted according to a cross-browser extension API. As mentioned above, the function call may be an asynchronous function. At step 304, translation module 110 sends to native browser 120 a request to access DOM data. The request may be sent using inter-process messaging. In response to the request, native browser 120 accesses the web page DOM data on its renderer thread at step 306. At step 308, native browser 120 may also conduct processing on the DOM data as set forth in the request. Depending on the request, there may or may not be a result of the processing to return back to browser extension 102.

If the DOM processing returns a result, translation module 110 receives a message from native browser 120 with the result of the processing at step 310. The message may be received as an inter-process message. In response to receipt of the message, a callback function may be executed on browser extension 102 at step 312. The callback function may receive the result as an input parameter.

In this way, browser extension 102 securely accesses the DOM data of a page loaded in native browser 120.

Figure 4:
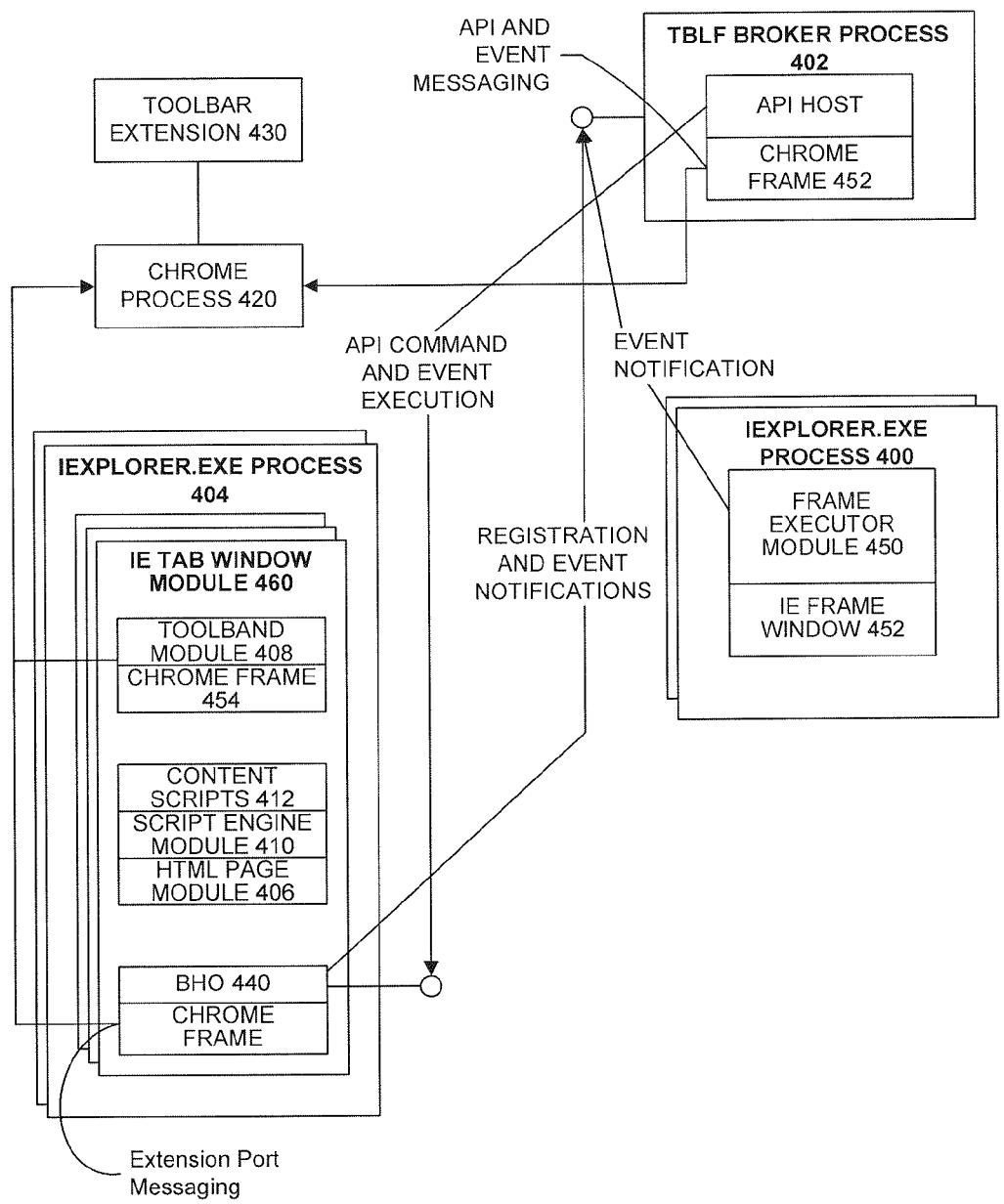
FIG. 4 is a diagram illustrating an exemplary system to execute a toolbar cross-browser extension in an Internet Explorer browser.

FIG. 4 is a diagram illustrating an exemplary system 400 to execute a toolbar cross-browser extension in an Internet Explorer browser. A toolbar is a useful browser extension that can provide a wide variety of features that supplement the web browsing experience including providing a search field, conducting spell check on web page forms, contributing to wiki-pages, auto-completing forms, and translating web page content. An example toolbar is a GOOGLE toolbar available from Google Inc.

System 400 includes a toolbar extension 430, a Chrome process 420, a TBLF broker process 402, iexplorer.exe process 404 and iexplorer.exe process 410.

Toolbar extension 430 implements a toolbar as a cross-browser extension, enabling update and management of the toolbar in a browser independent way. Toolbar extension 430 may, for example, specify UI surfaces for the toolbar, such as a toolstrip. Toolbar extension 430 may also specify functionality involving access to the DOM of the presently loaded page. For example, toolbar extension 430 may include Java-Script code that accesses the input text fields on a web page to conduct a spell check. Toolbar extension 430 is analogous to browser extension 102 in system 100.

Portions of TBLF broker process 402 along with portions of chrome process 420 may be analogous to aspects of translation module 110 in FIG. 1. TBLF broker process 402 may, for example, host the user context and UI context containers to execute browser extension code and to render UI surfaces associated with UI contexts. Chrome process 420 may be configured to receive the cross-browser commands included in toolbar extension 430. Chrome process 420 may interpret and execute the cross-browser commands by communicating with iexplorer.exe process 410, iexplorer.exe process 404, or both. Chrome process 420 may communicate with iexplorer.exe processes 410 and 404 via TBLF broker process 402.

TBLF broker process 402 may be analogous to aspects of cross-browser extension API 112 in FIG. 1. TBLF broker process 402 hosts the window, tab and bookmarks APIs and assists in event distribution. TBLF broker process 402 may include two registries. A first registry registers browser helper objects (BHO) instances (such as a BHO 440), and a second registry registers frame window executors (such as a frame executor 450). The registries may be used to forward event notification between Chrome process 420 and different components of iexplore.exe process 404 and 410. TBLF broker process 402 may include a non-visible instance of a Chrome frame 452, which it uses to pass API messages between itself and Chrome process 420. TBLF broker process 402 may be implemented, at least in part, as a Component Object Model (COM) multi-threaded apartment to allow concurrent execution of registrations and API execution. Using a multi-threaded COM apartment may avoid reentrancy issues associated with single-threaded COM apartments.

Iexplorer.exe process 410 includes a frame executor 450 and an IE frame window 452. IE frame window 452 may be a component of the Internet Explorer browser that encloses a set of tab windows. Frame executor 450 may be a COM object installed into the iexplorer.exe process 410 to access resources and APIs only available on that thread and communicate to Chrome process 420 or iexplorer.exe process 404 via TBLF broker process 402.

Iexplorer.exe process 404 includes one or more instances of IE tab window module 460. Each instance of tab window module 460 may manage a tab displayed in the browser, including a content area displaying a webpage and a user interface controls. In an example, tab window module 460 may be a competent provided with an INTERNET EXPLORER browser. Each tab window module 460 may include a toolband module 408, a Chrome frame 454, content script 412, a script engine module 410, an HTML page module 406 and a browser helper object (BHO) 440.

Toolband module 408 may be a plug-in for the INTERNET EXPLORER browser implemented in, for example, an ActiveX interface. Toolband module 408 may load a visible Chrome frame 454 which is displayed to the user on, for example, the browser toolstrip. At least a portion of the UI context is displayed to a user. Further, toolband module 408 may load data from the toolbar extension into Chrome frame 454, and Chrome frame 452 facilitates cross-browser API communication between Chrome process 420, hosting toolbar extension 430, and tab window module 460. Using Chrome frame 454, toolband module 408 enables display of, for example, toolbar buttons. In addition to loading Chrome frame 454, toolband module 408 may also integrate with the Internet Explorer browser's drawing and input handling functionality. Toolband module 408 may, for example, be analogous to aspects of toolbar frame module 226 in FIG. 2.

In addition to the toolband module 408, each instance of tab window modules 430 may include browser helper object (BHO) 440. Similar to toolband module 408, BHO 440 may be implemented as a plug-in and may implement an ActiveX interface. First, BHO 440 may assist in registering and processing events locally on iexplorer.exe process 404. Second, BHO 440 may assist in dispatching window and tab-related events to the TBLF broker process 402. Third, BHO 440 may assist toolbar extension 430 in accessing a DOM of a page loaded in tab window modules 430. For example, BHO 440 may receive an inter-process message including a script to access the DOM. In response, BHO 440 may instantiate script engine module 410 and load script engine module 410 with a content script 412 to service the request. Together, BHO 440 and script engine module 410 are analogous to aspects of DOM interface module 224 in FIG. 2.

As mentioned above, content script 412 may include a script that accesses the loaded page's DOM. For example, content script 412 may be a script that accesses the loaded page's DOM to check the spelling of text entered into text fields of the loaded page.

Script engine module 410 may execute content script 412. Script engine module 410 may, for example, be implemented as JScript running in an Active Script engine in the Internet Explorer browser. To access the loaded page's DOM, Script engine module 410 may interface with HTML page module 406. HTML page module 406 may be a component of the Internet Explorer browser that stores the presently loaded page (analogous to webkit). Content script 412 may involve returning a result. In that case, BHO 440 may send a message to Chrome process 420 with the result. In response to the message, Chrome process 420 may initiate a callback function in toolbar extension 430 with the result.

In the example with spell-check functionality, BHO 440 may operate as follows. BHO 440 may receive a message with a script to conduct the spell check. Then, BHO 440 may instantiate a script engine module 410 to execute the script. In executing the script, script engine module 410 may retrieve the text entered into each input text field from the DOM of the page loaded in HTML page module 406. As specified by the script, script engine module 410 may check the text to detect spelling errors. When the spell check is complete, BHO 440 may send a message to Chrome process 420 with the results of the spell check. BHO 440 may, for example, act as a pipe to send generic messages from script in the extension and running in script engine module 410, back to the extension running in Chrome process 420. On receipt of the message, Chrome process 420 may instantiate a callback function in toolbar extension 430. Chrome process 420 may input the spell check results as a parameter of the callback function.

By executing the extension functionality that accesses the DOM of the loaded page on the same process that renders the page and by executing the functionality asynchronously, embodiments stably execute cross-browser extensions. In this way, extensions can be developed and updated for multiple browsers.

System 400 may be implemented on any type of computing device as set forth above. Each component of system 400 may be implemented in hardware, software, firmware or any combination thereof.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for enabling cross-browser extensions, comprising:
   a computing device;
   a translation module, implemented on the computing device, configured to:
      receive a cross-browser command included in a browser extension, wherein the received cross-browser command is formatted according to a cross-browser extension application program interface, and wherein the cross-browser command instructs a native browser to access a document object model of a page, and
      interpret the cross-browser command to issue at least one native command formatted according to a native browser extension application program interface to the native browser to execute the cross-browser command; and
   a DOM (document object model) interface module, implemented on the computing device, configured to run on a renderer thread of the native browser, separate from the translation module, that renders the loaded page, wherein the DOM interface module, when loaded in the renderer thread, is configured to:
      receive a message from the translation module to access a document object model of a page loaded in a native browser, and
      access the document object model in response to the message,
   wherein the cross-browser extension application program interface provides, by message passing from the translation module to the document object model through a thread separate from the renderer thread, a stable interface that prevents deadlocks to implement browser extensions that can operate in a plurality of different types of web browsers.

2. The system of claim 1, wherein the cross-browser extension application program interface is defined as an asynchronous interface.

3. The system of claim 2, wherein the translation module configured to initiate a next cross-browser command in the browser extension before completion of a prior cross-browser command, and, on completion of the prior cross-browser command, the translation module execute a callback function of the browser extension.

4. The system of claim 1, wherein the translation module maintains state data representing an internal state of the native browser.

5. The system of claim 1, wherein the browser extension is not represented in native machine instructions.

6. The system of claim 5, wherein the browser extension is represented in at least one of HTML, XML, JavaScript, or CSS.

7. The system of claim 1, wherein the DOM interface module communicates with the translation module using message passing via an interprocess communication channel.

8. The system of claim 1, wherein the cross-browser extension application program interface further specifies at least:
   (i) a cross-browser command to create a tab in the native browser;
   (ii) a cross-browser command to get data on a presently opened tab in the native browser;
   (iii) a cross-browser command to create a UI surface defined at least using HTML;
   (iv) a cross-browser command to make a network request according to the native browser's settings;
   (v) a cross-browser command to create a bookmark in the native browser; and
   (vi) a cross-browser command to receive notifications from the native browser for browsing events including a page refresh event.

9. A computer-implemented method for enabling cross-browser extensions, comprising:
   (a) receiving, on a translation module, at least one cross-browser command included in a browser extension, the command formatted according to a cross-browser extension application program interface, wherein the cross-browser command instructs a native browser to access a document object model of a page;
   (b) interpreting, on the translation module, the cross-browser command formatted according to a cross-browser extension application program interface;
   (c) issuing at least one native command formatted according to a native browser extension application program interface to the native browser to execute the cross-browser command;
   (d) rendering the page on a DOM (document object model) interface module configured to run on a renderer thread of the native browser, separate from the translation module;
   (e) receiving, on the DOM interface module, a message to access a document object model of the page in the native browser; and
   (f) accessing, on the DOM interface module, the document object model of the page in response to the message,
   wherein the cross-browser extension application program interface provides, by message passing from the translation module to the document object model through a thread separate from the renderer thread, a stable interface that prevents deadlocks to implement browser extensions that can operate in a plurality of different types of web browsers.

10. The method of claim 9, wherein the cross-browser extension application program interface is defined as an asynchronous interface.

11. The method of claim 10, further comprising:
   (g) receiving a next cross-browser command in the browser extension command before completion of a cross-browser prior command in the browser extension; and
   (h) on completion of the cross-browser prior command, executing a callback function of the browser extension.

12. The method of claim 9, further comprising:
   (g) maintaining state data representing an internal state of the native browser.

13. The method of claim 9, wherein the receiving (e) comprises receiving the message with the command to access the document object model via an interprocess communication channel, and further comprising:
   (g) sending a message with data from the document object model via the interprocess communication channel.

14. The method of claim 9, wherein the browser extension is not represented in native machine instructions.

15. The method of claim 9, wherein the browser extension is represented in at least one of HTML, XML, JavaScript, or CSS.

16. The method of claim 9, wherein receiving (a) comprises:
   (i) receiving a cross-browser command to create a tab in the native browser;
   (ii) receiving a cross-browser command to get data on a presently opened tab in the native browser;
   (iii) receiving a cross-browser command to create a UI surface defined at least using HTML;
   (iv) receiving a cross-browser command to make a network request according to the native browser's settings;
   (v) receiving a cross-browser command to create a bookmark in the native browser; and
   (vi) receiving a cross-browser command to receive notifications from the native browser for browsing events including a page refresh event.

17. A system for enabling cross-browser extensions, comprising:
   a computing device;
   a browser extension, stored on the computing device, comprising a series of commands, at least some of the commands formatted according to a cross-browser extension application program interface;
   a translation module, implemented on the computing device, configured to
      receive a cross-browser command formatted according to a cross-browser extension application program interface included in the browser extension, wherein the cross-browser command accesses a document object model of a page loaded in a native browser, and
      interpret the cross-browser command to issue at least one native command formatted according to a native browser extension application program interface to the native browser to execute the cross-browser command; and
   a native browser, implemented on the computing device, with a renderer thread, separate from the translation module, that renders the loaded page separate from the translation and executes:
      a DOM (document object model) interface module configured to:
         receive a message from the translation module to access a document object model of a page loaded in a native browser, and
         access the document object model,
   wherein the cross-browser extension application program interface provides, by message passing from the translation module to the document object model through a thread separate from the renderer thread, a stable interface that prevents deadlocks to implement browser extensions that can operate in a plurality of different types of web browsers.

* * * * *